United States Patent
Desappan et al.

(10) Patent No.: US 9,508,018 B2
(45) Date of Patent: Nov. 29, 2016

(54) SYSTEMS AND METHODS FOR OBJECT DETECTION

(71) Applicant: TEXAS INSTRUMENTS INCORPORATED, Dallas, TX (US)

(72) Inventors: Kumar Arrakutti Desappan, Karnataka (IN); Manu Mathew, Karnataka (IN); Pramod Kumar Swami, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/551,942

(22) Filed: Nov. 24, 2014

(65) Prior Publication Data

US 2016/0148071 A1 May 26, 2016

(51) Int. Cl.
*G06K 9/00* (2006.01)
*G06K 9/46* (2006.01)
*G06K 9/62* (2006.01)

(52) U.S. Cl.
CPC ........... *G06K 9/4647* (2013.01); *G06K 9/4652* (2013.01); *G06K 9/6212* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,033,099 A * | 7/1991 | Yamada | G06K 9/48 | 382/197 |
| 7,324,665 B2 * | 1/2008 | Rohaly | G01P 5/001 | 382/107 |
| 7,689,016 B2 * | 3/2010 | Stoecker | G06F 19/321 | 382/128 |
| 7,760,940 B2 * | 7/2010 | Terakawa | G06K 9/00248 | 382/103 |
| 8,031,963 B2 * | 10/2011 | Sullender | H04N 5/217 | 382/260 |
| 8,059,888 B2 * | 11/2011 | Chen | G06T 17/10 | 345/419 |
| 8,811,663 B2 * | 8/2014 | Brown | G06K 9/00778 | 382/103 |
| 9,008,365 B2 * | 4/2015 | Xu | G06K 9/00369 | 382/103 |
| 9,129,381 B2 * | 9/2015 | Steinberg | G06T 7/0081 | |
| 2004/0062420 A1 * | 4/2004 | Rohaly | G01P 5/001 | 382/107 |
| 2006/0269111 A1 * | 11/2006 | Stoecker | G06F 19/321 | 382/128 |
| 2007/0036431 A1 * | 2/2007 | Terakawa | G06K 9/6256 | 382/170 |
| 2014/0314271 A1 * | 10/2014 | Xu | G06K 9/00369 | 382/103 |
| 2015/0042872 A1 * | 2/2015 | Suzuki | H04N 9/045 | 348/370 |
| 2015/0062166 A1 * | 3/2015 | Pan | G06T 7/0081 | 345/633 |
| 2015/0138575 A1 * | 5/2015 | Takamizawa | G03G 15/6585 | 358/1.9 |

FOREIGN PATENT DOCUMENTS

WO 01/27780 A1 4/2001

OTHER PUBLICATIONS

Art Cite, PCT International Search Report dated Mar. 10, 2016.

* cited by examiner

*Primary Examiner* — Anand Bhatnagar
(74) *Attorney, Agent, or Firm* — Lawrence J. Bassuk; Frank D. Cimino

(57) ABSTRACT

An object detection system and a method of detecting an object in an image are disclosed. In an embodiment, a method for detecting the object includes computing one or more feature planes of one or more types for each image pixel of the image. A plurality of cells is defined in the image, where each cell includes first through $n^{th}$ number of pixels, and starting locations of each cell in the image in horizontal and vertical directions are integral multiples of predefined horizontal and vertical step sizes, respectively. One or more feature plane summations of one or more types are computed for each cell. A feature vector is determined for an image portion of the image based on a set of feature plane summations, and the feature vector is compared with a corresponding object classifier to detect a presence of the corresponding object in the image portion of the image.

20 Claims, 7 Drawing Sheets

SYSTEMS AND METHODS FOR OBJECT DETECTION

TECHNICAL FIELD

The present disclosure generally relates to the field of object detection, for example detection of pedestrian and other objects from vehicles.

BACKGROUND

Nowadays, vehicles are equipped with object detectors to detect objects, for example, pedestrians on the road and provide warnings/brake-assistance to the driver. An object detector employs a video camera to capture videos/images in front of and around the vehicle, and applies image processing techniques therein for identifying obstacles and pedestrians in front of and around the vehicle.

Existing object detectors employ histogram of oriented gradients (HOG) based object detection techniques, in which an image is divided into a plurality of blocks, and an amount of magnitude of a pixel gradient in any orientation in each block is counted to form a HOG of the image. Machine learning methods apply identification and classification techniques to the HOG so as to effectively identify the pedestrians and predefined objects in the image. The HOG of the image is computed based on gradient orientation and gradient magnitude of each image pixel. For an image pixel, corresponding gradient orientation θ is expressed as $$\theta = \tan^{-1}(y/x)$$

where y=gradient in vertical direction, and
x=gradient in horizontal direction.

The computation of the gradient orientation θ in a fixed point processor is traditionally implemented by using two look up-tables, one for division and another for tan inverse ($\tan^{-1}$). Use of the two look-up tables for computation of the gradient orientation of each image pixel is very time consuming, requires very high computation as well as high memory bandwidth, which makes it very difficult to implement with real time performance on an embedded system. Memory bandwidth is an important resource in any system, especially in a multi-core system. The memory bandwidth plays a crucial role in optimizing system performance. So it is very crucial to have the memory bandwidth as small as possible so that other processers also work in parallel effectively.

Other object detection techniques include computing an integral image for reducing number of computations. However, computation of the integral image reduces the number of computations, but increases an intermediate data element size, which again requires high memory bandwidth.

SUMMARY

This summary is provided to introduce a selection of concepts in a simplified form that are further described below in the detailed description. This summary is not intended to identify key or important features of the claimed subject matter, nor is it intended to be used as an aid in determining the scope of the claimed subject matter.

An object detection system and one or more methods of detecting an object in an image are disclosed. An object detection system for detecting an object in an image is disclosed, where the image includes a plurality of image pixels. The object detection system includes a memory to store instructions, and a processor responsive to stored instructions to perform the steps of computing one or more feature planes of one or more types for each image pixel of the image and defining of a plurality of cells in the image. Each cell includes first through $n^{th}$ number of pixels, and starting locations of each cell in the image in horizontal and vertical directions are integral multiples of predefined horizontal and vertical step sizes respectively. The processor is further responsive to stored instructions to perform the steps of computing one or more feature plane summations of one or more types for each cell of the plurality of cells. A feature plane summation of a type for a cell is computed by summing corresponding features of the first through $n^{th}$ number of pixels of the cell, where n is an integral number. The processor is furthermore responsive to stored instructions to perform the steps of determining a feature vector for an image portion of the image, where the feature vector includes a set of feature plane summations of one or more cells defined in the image portion, and comparing of the feature vector with a corresponding object classifier to detect a presence of the object in the image portion of the image.

Additionally, in an embodiment, a method of detecting an object in an image is disclosed, where the image includes a plurality of image pixels. The method includes computing one or more feature planes of one or more types for each image pixel of the image, and defining a plurality of cells in the image. Each cell includes first through $n^{th}$ number of pixels, and starting locations of each cell in the image in horizontal and vertical directions are integral multiples of predefined horizontal and vertical step sizes respectively. Further, the method includes computing one or more feature plane summations of one or more types for each cell of the plurality of cells. A feature plane summation of a type for a cell is computed by summing corresponding features of the first through nth number of pixels of the cell, where n is an integral number. Furthermore, the method includes determining a feature vector for an image portion of the image. The feature vector includes a set of feature plane summations of one or more cells defined in the image portion. Moreover, the method includes comparing the feature vector with a corresponding object classifier to detect a presence of the object in the image portion of the image.

Moreover, in an embodiment, a method of detecting an object in an image is disclosed, where the image includes a plurality of image pixels. The method includes computing one or more feature planes of one or more types for each image pixel of the image, and defining a plurality of cells in the image. Each cell includes first through $n^{th}$ number of pixels, and starting locations of each cell in the image in horizontal and vertical directions are integral multiples of predefined horizontal and vertical step sizes respectively. Further, the method includes computing one or more feature plane summations of one or more types for each cell of the plurality of cells. A feature plane summation of a type for a cell is computed by summing corresponding features of the first through nth number of pixels of the cell, where n is an integral number. Furthermore, the method includes performing in an iterative manner, selecting a type of feature plane from the one or more types of feature planes, computing a partial feature vector, comparing the partial feature vector with a corresponding partial classifier of the object, and storing a result of a comparison in the memory. The partial feature vector includes one or more feature plane summations of the selected type, for one or more cells of the image portion. Moreover, the method includes collating one or more comparison results corresponding to each type of the feature plane, and detecting the presence of the object in the image based on the collated results.

Other aspects and example embodiments are provided in the drawings and the detailed description that follow.

The drawings referred to in this description are not to be understood as being drawn to scale except if specifically noted, and such drawings are only example in nature.

DETAILED DESCRIPTION

Figure 1:
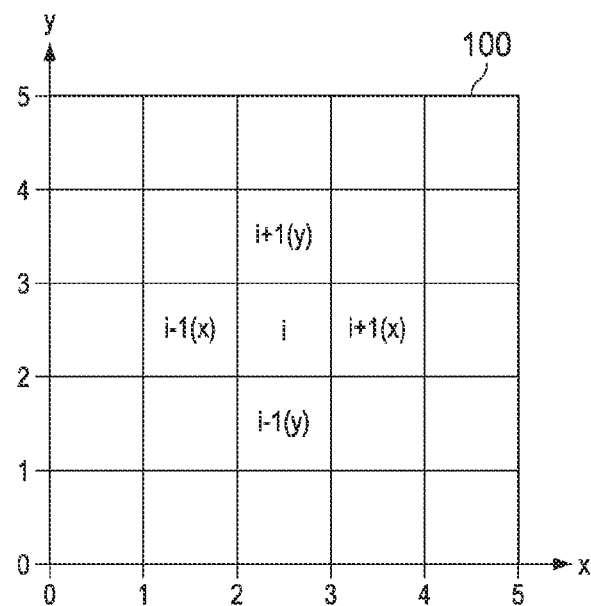
FIG. 1 illustrates an image comprising a plurality of image pixels, in accordance with an example scenario.

Referring to FIG. 1, an image 100 is illustrated that is formed of a plurality of image pixels. For an $i^{th}$ image pixel, $i+1^{th}$ (x) and $i-1^{th}$ (x) are adjacent image pixels in x-direction, and $i+1^{th}$ (y) and $i-1^{th}$ (y) are adjacent image pixels in y-direction. Each image pixel has an intensity and a gradient, where a gradient of an $i^{th}$ image pixel has a magnitude $MG_i$ and an orientation $\theta_i$. The orientation $\theta_i$ of the gradient of the $i^{th}$ image pixel is represented by the following expression:

$$\theta_i = \tan^{-1} y_i / x_i \quad (1)$$

where,
$x_i$=horizontal gradient of the $i^{th}$ pixel
$y_i$=vertical gradient of the $i^{th}$ pixel In an example, the horizontal gradient of the $i^{th}$ pixel has a magnitude and a directionality 'positive' or 'negative', and is represented by the following expression:

$$x_i = I(x_{i-1}) - I(x_{i+1}) \quad (2)$$

where,
$I(x_{i-1})$=Intensity of corresponding horizontally left pixel, i.e. $i-1^{th}$ (x) pixel
$I(x_{i+1})$=Intensity of corresponding horizontally right pixel, i.e. $i+1^{th}$ (x) pixel Similarly, in this example, the vertical gradient of the $i^{th}$ pixel has a magnitude and a directionality 'positive' or 'negative', and is represented by the following expression:

$$y_i = I(y_{i-1}) - I(y_{i+1}) \quad (3)$$

where,
$I(y_{i+1})$=Intensity of corresponding vertically above pixel, i.e. $i+1^{th}$ (y) pixel
$I(y_{i+1})$=Intensity of vertically below pixel, i.e. $i-1^{th}$ (y) pixel The magnitude of the horizontal gradient $MGx_i$ is represented by the following expression:

$$MGx_i = Abs(I(x_{i-1}) - I(x_{i+1})) \quad (4)$$

The magnitude of the vertical gradient $MGy_i$ is represented by the following expression:

$$MGy_i = Abs(I(y_{i-1}) - I(y_{i+1})) \quad (5)$$

The magnitude $MG_i$ of the gradient of the $i^{th}$ pixel is represented by the following expression:

$$MG_i = \sqrt{MGxi^2 + MGyi^2} \quad (6)$$

Alternatively, the magnitude $MG_i$ of gradient of the $i^{th}$ pixel can be represented by the following expression:

$$MG_i = MGx_i + MGy_i \quad (7)$$

The computation of the gradient for the $i^{th}$ pixel provided in the above expressions should not be considered limiting, and other mathematical expressions can also be utilized for computing the gradient. For instance, in another example, the horizontal gradient of the $i^{th}$ pixel can be determined using intensity differences of the $i^{th}$ pixel with either the $i+1^{th}$ (x) pixel or the $i-1^{th}$ (x) pixel; and the vertical gradient of the $i^{th}$ pixel can be determined using intensity differences of the $i^{th}$ pixel with either the $i+1^{th}$ (y) pixel or the $i-1^{th}$ (y) pixel.

Figure 2:
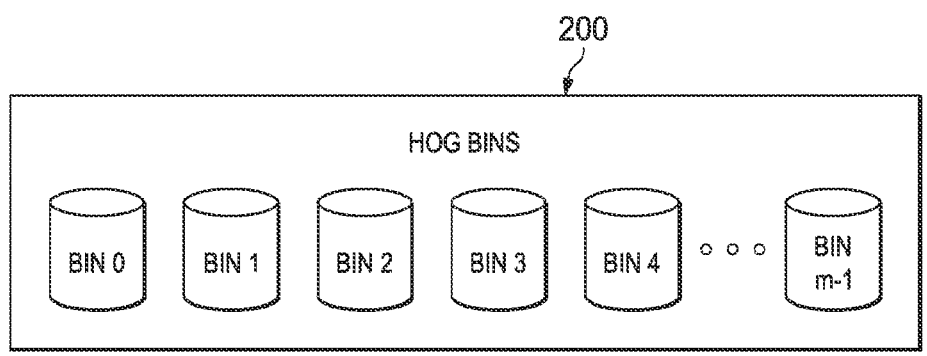
FIG. 2 illustrates first through $m^{th}$ number of HOG bins, in accordance with an example scenario.

FIG. 2 illustrates Histogram of Gradients (HOG) bins 200 used for object detection in the image 100, in accordance with an example embodiment. The HOG bins 200 include first through $m^{th}$ bins, Bin 0 till Bin m−1. For the purpose of object detection, each image pixel of the image 100 is categorized in one of the first through $m^{th}$ bins based on an orientation θ of corresponding gradient. In this example, the value of m=6, however, in another example scenario, the value of m may be different, for example, including, but not limited to, 8 and 10.

Figure 3A:
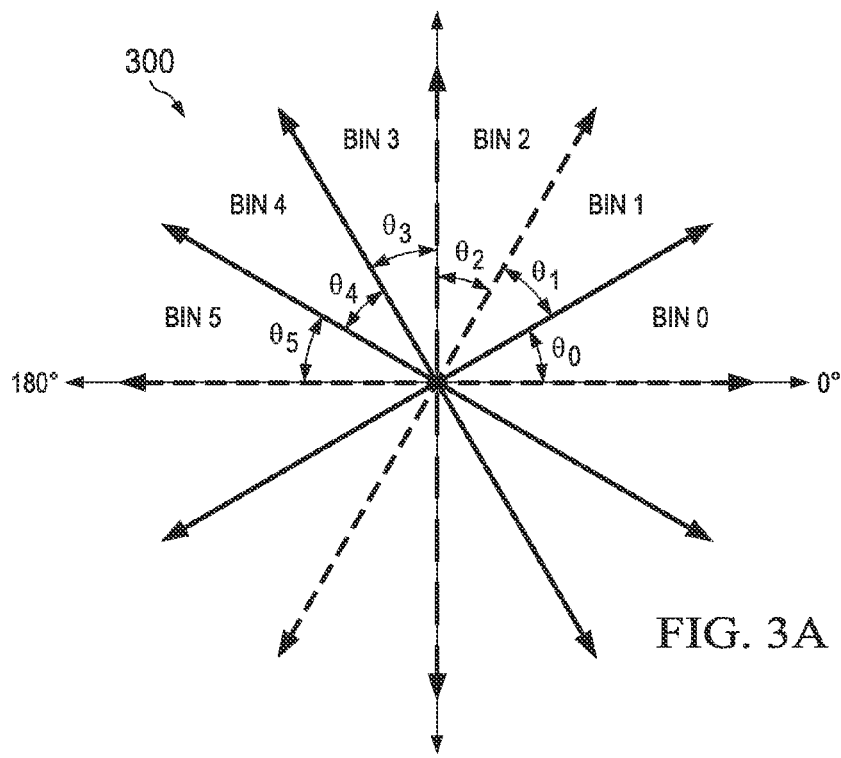
FIGS. 3A and 3B illustrates first and second sets 300 and 302 of six and eight HOG bins respectively, in accordance with an example scenario.
Figure 3B:
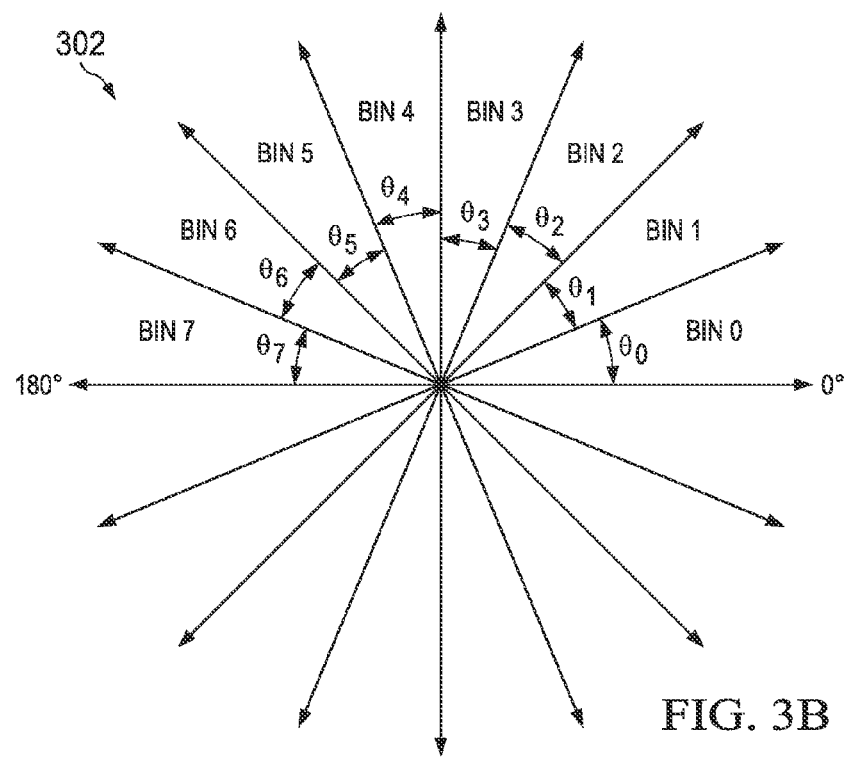

FIGS. 3A and 3B illustrate a first set 300 of six HOG bins, and a second set 302 of eight HOG bins respectively, in accordance with an example scenario.

In existing implementations of the prior art (i.e., those not in accordance with example embodiments of the present disclosure), each HOG bin of the first and second sets 300 and 302 is assigned an equal orientation range within 0-180° degrees. For example when m=6, each HOG bin is assigned 30° degrees, such that Bin 0 extends from 0 to 30°, Bin 1 extends from 30° to 60°, and so on. Similarly, when m=8, each HOG bin is assigned 22.5° degrees, such that Bin 0 extends from 0 to 22.5°, Bin 1 extends from 22.5° to 45°, and so on. An image pixel is assigned a HOG bin by comparing the ratio of corresponding vertical and horizontal gradients with tangent values of corresponding orientation range. For example, when the value of m=6, ratio of vertical and horizontal gradients (y/x) of the image pixel may be compared with tan 0° and tan 30° values to check whether the corresponding gradient is in Bin 0. Similarly, the ratio (y/x) may be compared with tan 30° and tan 60° values to check whether the corresponding gradient is in Bin 1, and so on. The values of tan 30°, 60°, 120° and 150° are 1/√3, √3, −√3, and −1/√3 respectively, which are irrational numbers, due to which the computation of HOG bin for an image pixel is a complex and time consuming task.

In contrast with the existing prior art implementation, in various example implementations according to the present disclosure, the HOG bins of the first and second sets 300 and 302 are assigned unequal orientation ranges in order to simplify the computation of HOG bins for the image pixels of the image. In an embodiment, the maximum and minimum binning angles $\theta_{min}$ and $\theta_{max}$ for each bin of first and second sets 300 and 302 bins are selected in such a manner that each of tan $\theta_{min}$ and tan $\theta_{max}$ are rational numbers and may be computed without division or multiple operation. Further, each of at least one of shift operation, subtraction operation and comparison operation can be used to compute HOG bins of image pixels. For the first set 300 of HOG bins, the minimum and maximum binning angles for each bin, are illustrated in Table I below:

TABLE I

| Bin | Minimum binning angle ($\theta_{min}$) | Maximum binning angle ($\theta_{max}$) | Difference ($\theta_{max} - \theta_{min}$) | Tangent of minimum binning angle (tan $\theta_{min}$) | Tangent of maximum binning angle (tan $\theta_{max}$) |
|---|---|---|---|---|---|
| Bin 0 | 0 | 26.5° | $\theta_0$ = 26.5 | 0 | 0.5 |
| Bin 1 | 26.5 | 63.5° | $\theta_1$ = 37 | 0.5 | 2 |
| Bin 2 | 63.5° | 90° | $\theta_2$ = 26.5 | 2 | +∞ |
| Bin 3 | 90° | 116.5° | $\theta_3$ = 26.5 | +∞ | −2 |
| Bin 4 | 116.5° | 153.5° | $\theta_4$ = 37 | −2 | −0.5 |
| Bin 5 | 153.5° | 180° | $\theta_5$ = 26.5 | −0.5 | 0 |

For the second set 302 of HOG bins, the minimum and maximum binning angles for each bin, are illustrated in Table II below:

TABLE II

| Bin | Minimum binning angle ($\theta_{min}$) | Maximum binning angle ($\theta_{max}$) | Difference ($\theta_{max} - \theta_{min}$) | Tangent of minimum binning angle (tan $\theta_{min}$) | Tangent of maximum binning angle (tan $\theta_{max}$) |
|---|---|---|---|---|---|
| Bin 0 | 0 | 20.55° | $\theta_0$ = 20.55 | 0 | 0.375 |
| Bin 1 | 20.55 | 45.0° | $\theta_1$ = 24.45 | 0.375 | 1 |
| Bin 2 | 45.0° | 69.45° | $\theta_2$ = 24.45 | 1 | 2.665 |
| Bin 3 | 69.45° | 90° | $\theta_3$ = 20.55 | 2.665 | +∞ |
| Bin 4 | 90.0° | 110.55° | $\theta_4$ = 20.55 | +∞ | −2.665 |
| Bin 5 | 110.55° | 135° | $\theta_5$ = 24.45 | −2.665 | −1 |
| Bin 6 | 135° | 159.45° | $\theta_6$ = 24.45 | −1 | −0.375 |
| Bin 7 | 159.45° | 180° | $\theta_7$ = 20.55 | −0.375 | 0 |

Figure 4:
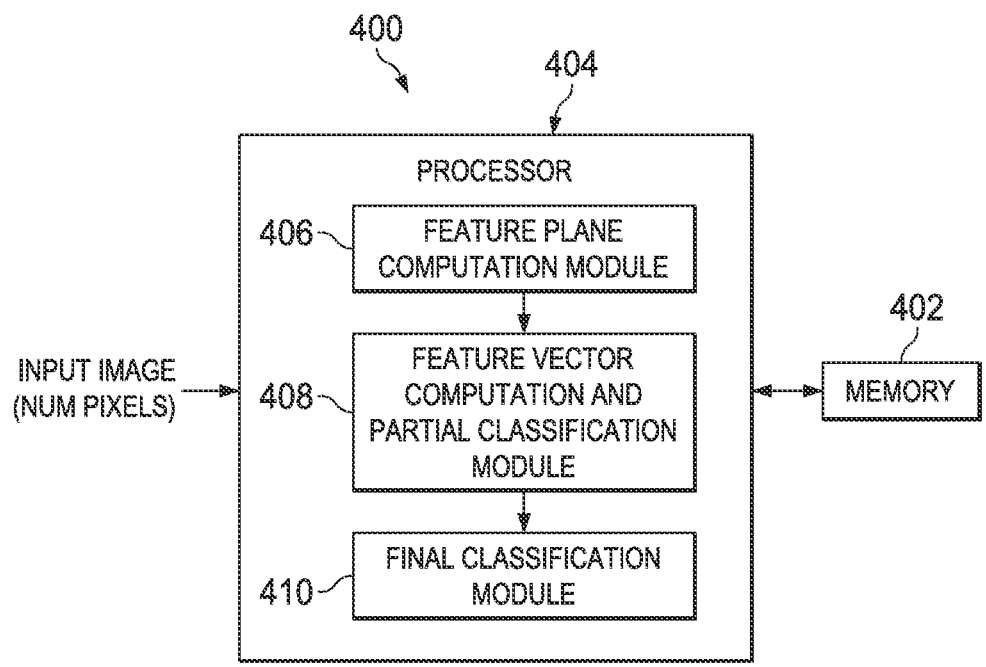
FIG. 4 illustrates a block diagram of an object detection system, in accordance with an embodiment.

FIG. 4 illustrates a block diagram of an object detection system 400, in accordance with an embodiment. In an example scenario, the object is a pedestrian on a road and the object detection system 400 is employed in a vehicle or any other moving platform for assisting in object detection on the road. The object detection system 400 may also be referred to as a pedestrian detection system 400. The object detection system 400 includes a memory 402 for storing instructions, and a processor 404 responsive to stored instructions to perform the steps of object detection in an image. The processor 404 includes a feature plane computation module 406, a feature vector computation and partial classification module 408, and a final classification module 410. The memory 402 may be any volatile or non-volatile memory, for example, including, but not limited to Random Access Memory (RAM), Read Only Memory (ROM), Static Dynamic RAM (SDRAM), Double data rate (DDR) RAM, and DDR SDRAM. Similarly, the processor 404 may include a variety of devices known to those skilled in the art to facilitate or enable the execution or performance of software instructions, protocols, or logical instructions stored on the memory 402. For instance, the processor 404 may be embodied as one or more integrated circuit devices, central processing units (CPUs), microprocessors, or the like. The processor 404 may also include memory devices (e.g., a processor cache), time keeping devices (e.g., a real-time clock (RTC)), and/or additional circuitry or data transmission channels. One typical example of the processor 404 includes, but is not limited to, an embedded vision engine (EVE). As such, the modules inside the processor 404 (for example, modules 406, 408 and 410) can be embodied in form of a single entity or different entities (for example, integrated circuits, with or without software and firmware). It should also be noted that the processor 404 can also include or otherwise be in communication with hardware systems for assisting in capture and/or post-processing of images and/or video of the objects on the road. The images and/or video can be captured by image capturing devices, for example cameras accessible to the processor 404.

The feature plane computation module 406 receives an input image, for example the image 100 (see, e.g., FIG. 1), and computes 'h' feature planes for each image pixel of the image 100. Typically, h=m+4, where m is equal to the total number of HOG bins. In an example scenario, the number of feature planes h is equal to 10, when the number of HOG bins is equal to 6. For the following description, the number of feature planes 'h' is considered to be ten throughout, unless otherwise specified.

The feature plane computation module 406 computes a feature set $F_i$ of ten types of feature planes for each image pixel of the image 100. The feature set $F_i$ of an $i^{th}$ pixel is represented by the following expression:

$$F_i = \{Y_i, U_i, V_i, M_i, B_{i0}, B_{i1}, B_{i2}, B_{i3}, B_{i4}, B_{i5}\} \quad (8)$$

where, $Y_i$, $U_i$, $V_i$, are color feature planes that represent a predefined color scheme of the $i^{th}$ pixel, $M_i$ is a magnitude feature plane that represents a gradient magnitude of the $i^{th}$ pixel, and $B_{i0}$, $B_{i1}$, $B_{i2}$, $B_{i3}$, $B_{i4}$, $B_{i5}$ are HOG feature planes that represent gradient magnitude of the $i^{th}$ pixel in Bin 0, Bin 1, Bin 2, Bin 3, Bin 4 and Bin 5 respectively. In an example embodiment, the $i^{th}$ pixel has a non-zero gradient magnitude in one bin, and zero gradient in other five bins.

In an example embodiment, the feature plane computation module 406 computes or otherwise accesses, the values of $Y_i$, $U_i$, $V_i$, $M_i$ for an $i^{th}$ pixel based on existing techniques known in the art. The feature plane computation module 406 computes the values of $B_{i1}$, $B_{i1}$, $B_{i2}$, $B_{i3}$, $B_{i4}$, $B_{i5}$ based on a magnitude and orientation of the gradient of the $i^{th}$ pixel, which in turn is estimated based on corresponding horizontal and vertical gradients $x_i$ and $y_i$.

The feature plane computation module 406 refers to first and second threshold values and comparison conditions specified in below Table III to compute an HOG bin of the gradient of the $i^{th}$ pixel where the number of HOG bins is equal to 6.

TABLE III

| Bin | First threshold (tan $\theta_{min}$) | Second threshold (tan $\theta_{max}$) | Comparison condition (<< and >> are bit-wise left and right-shift operators respectively) |
|---|---|---|---|
| Bin 0 | 0 | 0.5 | $0 <= y_i/x_i < 0.5$, i.e., $y_i >= 0$ and $(x_i >> 1) > y_i$ |
| Bin 1 | 0.5 | 2 | $0.5 <= y_i/x_i < 2$, i.e., $(x_i >> 1) < y_i$ and $y_i < (x_i << 1)$ |
| Bin 2 | 2 | +∞ | $2 <= y_i/x_i < +\infty$, i.e. $y_i >= (x_i << 1)$ and $x_i > 0$ |
| Bin 3 | +∞ | −2 | $+\infty <= y_i/x_i < -2$, i.e. $y_i < -(x_i << 1)$ and $x_i <= 0$ |

TABLE III-continued

| Bin | First threshold (tan $\theta_{min}$) | Second threshold (tan $\theta_{max}$) | Comparison condition (<< and >> are bit-wise left and right-shift operators respectively) |
|---|---|---|---|
| Bin 4 | −2 | −0.5 | −2 <= $y_i/x_i$ < −0.5, i.e. $x_i$ >= −($y_i$ << 1) and $y_i$ >= −$x_i$ << 1) |
| Bin 5 | −0.5 | 0 | −0.5 <= $y_i/x_i$ < 0, i.e. $x_i$ <= −($y_i$ << 1) and $y_i$ > 0 |

The feature plane computation module 406 refers to first and second threshold values and comparison conditions specified in below Table IV to compute a HOG bin of the gradient of the $i^{th}$ pixel where the number of HOG bins is equal to 8.

TABLE IV

| Bin | First threshold (tan $\theta_{min}$) | Second threshold (tan $\theta_{max}$) | Comparison condition (<< and >> are bit-wise left and right-shift operators respectively) |
|---|---|---|---|
| Bin 0 | 0 | 0.375 | 0 <= $y_i/x_i$ < 0.375, i.e., $y_i$ >= 0 and ($x_i$ >> 2 + $x_i$ >> 4) > $y_i$ |
| Bin 1 | 0.375 | 1 | 0.375 <= $y_i/x_i$ < 1, i.e., ($x_i$ >> 2 + $x_i$ >> 4) < $y_i$ and $y_i$ < x |
| Bin 2 | 1 | 2.665 | 1 <= $y_i/x_i$ < 2.665, i.e. $y_i$ >= x and ($y_i$ >> 2 + $y_i$ >> 4) < $x_i$ |
| Bin 3 | 2.665 | +∞ | 2.665 <= $y_i/x_i$ < +∞, i.e. ($y_i$ >> 2 + $y_i$ >> 4) >= $x_i$ and $x_i$ >= 0 |
| Bin 4 | +∞ | −2.665 | +∞ <= $y_i/x_i$ < −2.665, i.e. ($y_i$ >> 2 + $y_i$ >> 4) >= −$x_i$ and $x_i$ >= 0 |
| Bin 5 | −2.665 | −1 | −2.665 <= $y_i/x_i$ < −1, i.e. $y_i$ >= −x and ($y_i$ >> 2 + $y_i$ >> 4) < −$x_i$ |
| Bin 6 | −1 | −0.375 | −1 <= $y_i/x_i$ < −0.375, i.e., −($x_i$ >> 2 + $x_i$ >> 4) < $y_i$ and $y_i$ < −x |
| Bin 7 | −0.375 | 0 | −0.375 <= $y_i/x_i$ < 0, i.e., $y_i$ >= 0 and −($x_i$ >> 2 + $x_i$ >> 4) > $y_i$ |

A bin is assigned to an $i^{th}$ pixel when its horizontal and vertical gradients $x_i$ and $y_i$ satisfy corresponding comparison condition. Based on Tables III and IV, the computation of HOG bin for an image pixel primarily includes shifts and comparisons. This is possible because $\theta_{min}$ and $\theta_{max}$ for each HOG bin are defined such that each of tan $\theta_{min}$ and tan $\theta_{max}$ are rational numbers.

After computing a HOG bin for a gradient of the $i^{th}$ pixel, the feature plane computation module 406 computes a magnitude of corresponding gradient based on expression 6. Thereafter, the feature plane computation module 406 assigns the magnitude value to the HOG feature plane corresponding to the computed HOG bin, and assigns zero values to remaining HOG feature planes. In an example scenario, when the feature plane computation module 406 computes a gradient magnitude $M_i$ in Bin 1 for the $i^{th}$ image pixel, then the feature set $F_i$ is represented as following:

$$F_i = \{Y_i, V_i, M_i, 0, M_i, 0, 0, 0, 0\}$$

In a similar manner, the feature computation module 406 computes feature sets for each image pixel of the input image, and stores the same in the memory 402. In an example scenario of the prior art (not in accordance with example embodiments of the present disclosure), when the number of feature sets is equal to the number of image pixels, the most time consuming part of the feature plane computation has been computing the orientation θ of the gradient for determining a corresponding HOG bin. In contrast, in various example embodiments of the present disclosure, the feature computation module 406 bypasses the computation of the orientation θ and determines a HOG bin of an image pixel based on the mathematical relationship between horizontal and vertical gradients of the image pixel. This results in around 30-45% performance improvement in feature plane computation.

The feature plane computation module 406 further defines a plurality of cells in the image 100. A cell is a unit of the image 100 with size as ($C_x$, $C_y$), where $C_x$ is cell width, $C_y$ is cell height, and ($C_x*C_y$) is total number of pixels in the cell. The starting locations of each cell in the image 100 in horizontal and vertical directions are integral multiples of predefined horizontal and vertical step sizes respectively. The cells within the input image are further illustrated with reference to FIGS. 5A and 5B and FIGS. 6A, 6B and 6C.

Figure 5B:
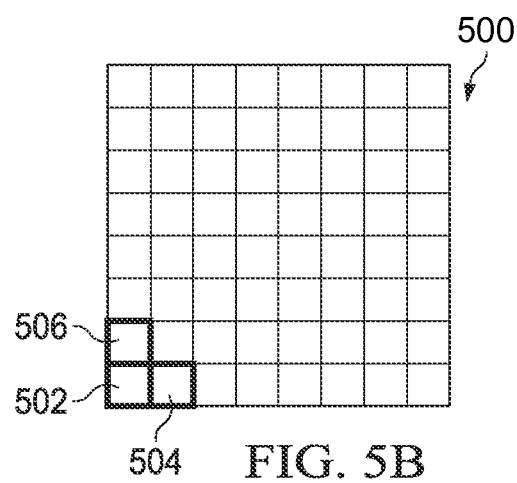
FIGS. 5A and 5B illustrate cells of size (6, 6) defined in an image of size (64, 128), in accordance with an example scenario.
Figure 5A:
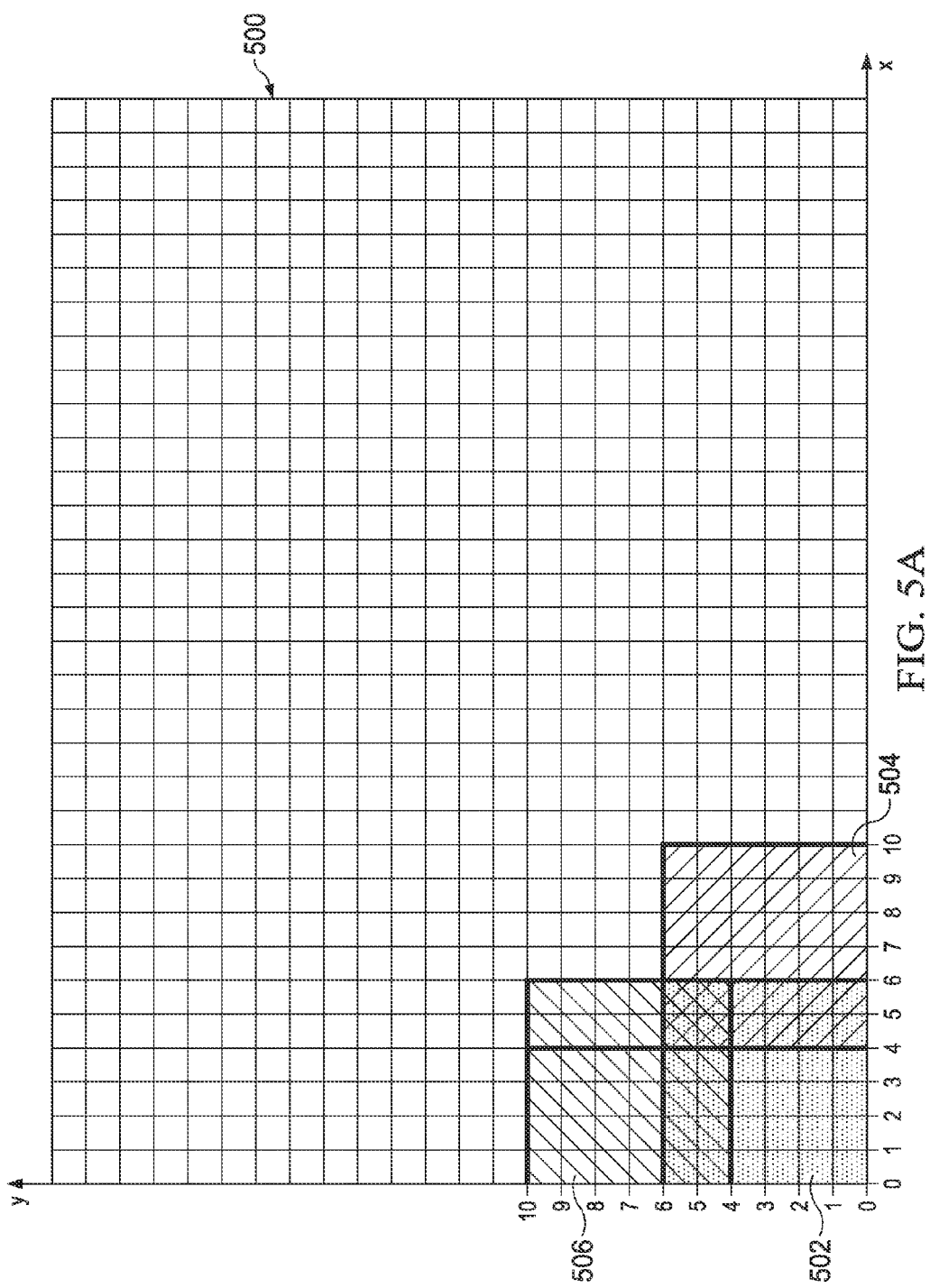

FIGS. 5A and 5B illustrate an image 500 of size (64, 128) including first, second and third cells 502, 504, 506 of size (6, 6), in accordance with an example embodiment. Only few cells 502, 504, 506 are shown for facilitating the description of some examples embodiments, and as such it should be understood that the cells are defined in the entire image 500. The first cell 502 extends from $0^{th}$ to sixth pixels in both x and y directions. The second cell 504 extends from fourth to tenth pixels in the x-direction, and from $0^{th}$ to sixth pixels in the y-direction. The third cell 506 extends from $0^{th}$ to sixth pixels in the x-direction, and from fourth to tenth pixels in the y-direction.

In one embodiment, the starting locations of each cell in the image 500 in x and y directions are multiples of predefined horizontal and vertical step sizes respectively. For instance, when the horizontal and vertical step sizes are 4 pixels each, then irrespective of cell size, the starting locations of the cells are at 0, 4, 8, 12 . . . pixels in x and y directions. In an example scenario, the starting locations of the first and second cells 502 and 504 along x-direction are $0^{th}$ and $4^{th}$ pixels respectively. Further, the starting locations of the first and third cells 502 and 506 along the y-direction are $0^{th}$ and $4^{th}$ pixels respectively. It may be noted that when the horizontal and vertical cell sizes differs from corresponding step sizes, then some image pixels of adjacent cells overlap with each other.

The feature plane computation module 406 (see FIG. 4), computes a feature plane summation for each type of feature plane, for each cell of the input image 500. A feature plane summation for a cell is computed by summing those features of image pixels of the cell that are of similar type. In an example scenario, a feature plane summation $C_1(Y)$ (of type Y-feature plane) for the first cell 502 of size (6*6) is computed by summing Y-feature planes of all the 36 pixels of the first cell 502, and is represented by the following expression:

$$C_1(Y) = \sum_{i=0}^{35} Y_i \quad (9)$$

A feature plane summation $C_1(U)$ (of type U-plane) for the first cell 502 of size (6*6) is computed by summing U-feature planes of all the 36 pixels of the first cell 502, and is represented by the following expression:

$$C_1(U) = \sum_{i=0}^{35} U_i \quad (10)$$

Thus, the feature plane computation module 406 computes ten feature plane summations corresponding to ten feature planes, for an $i^{th}$ cell of the image 500. The set $S_i$ of feature plane summations for an $i^{th}$ cell is represented by the following expression:

$$S_i = \{C_i(Y), C_i(U), C_i(V), C_i(M), C_i(B_0), C_i(B_1), C_i(B_2), C_i(B_3), C_i(B_4), C_i(B_5)\} \quad (11)$$

Where,
$C_i(Y)$, $C_i(U)$ and $C_i(V)$ are Y, U and V feature plane summations for the $i^{th}$ cell;
$C_i(M)$ is M feature plane summation for the $i^{th}$ cell; and
$C_i(B_0)$, $C_i(B_1)$, $C_i(B_2)$, $C_i(B_3)$, $C_i(B_4)$ and $C_i(B_5)$ are HOG feature plane summations for $i^{th}$ the cell.

Figure 6A:
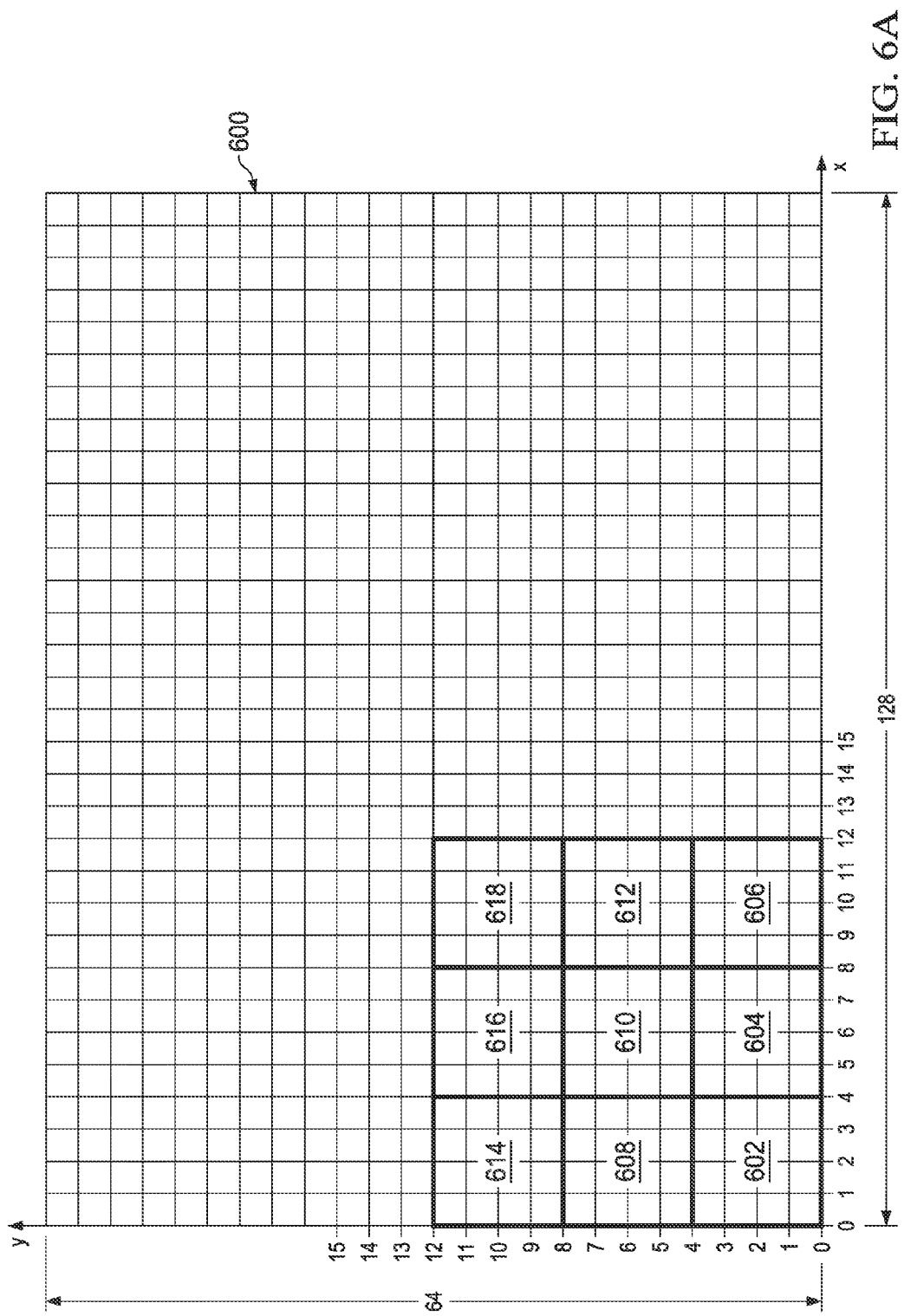
FIGS. 6A and 6B illustrate cells of size (4, 4) defined in an image of size (64, 128), in accordance with an example scenario.
Figure 6B:
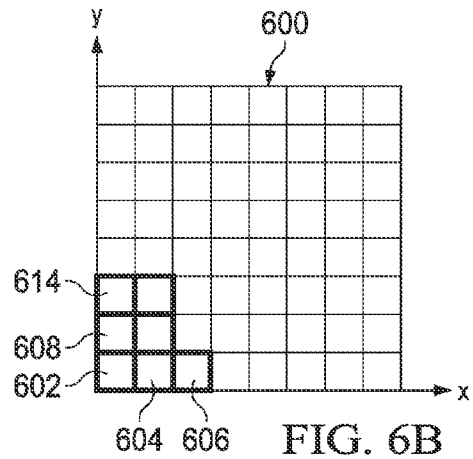

FIGS. 6A and 6B illustrate an image 600 of size (for example, 64, 128) including first through ninth cells 602 till 618, where size of each cells 602-618 is 4*4 (for example, containing 16 pixels). For instance, the cell 602 extends from $0^{th}$ to fourth pixels in both x and y directions, the cell 604 extends from fourth to eighth pixels in the x-direction, and from $0^{th}$ to fourth pixels in the y-direction, the cell 606 extends from eight to twelfth pixels in the x-direction, and from $0^{th}$ to fourth pixels in the y-direction, and so on.

The feature plane computation module 406 (see FIG. 4), computes a feature plane summation of each type for each cell of the input image 600. In an example scenario, a feature plane summation $C_2(V)$ (of type V-plane) for the first cell 602 of size (4*4) is computed by summing V-feature planes of all the 16 pixels of the first cell 602, and is represented by the following expression:

$$C_2(V) = \sum_{i=0}^{15} V_i \quad (12)$$

A feature plane summation $C_2(M)$ (of type M-feature plane) for the cell 602 of size (4*4) is computed by summing M-feature planes of all the 16 pixels of the first cell 604, and is represented by the following expression:

$$C_2(M) = \sum_{i=0}^{15} M_i \quad (13)$$

Similar to the expressions 11 and 12, the feature plane computation module 406 computes ten feature plane summations corresponding to ten feature planes, for each cell of the image 600.

Figure 6C:
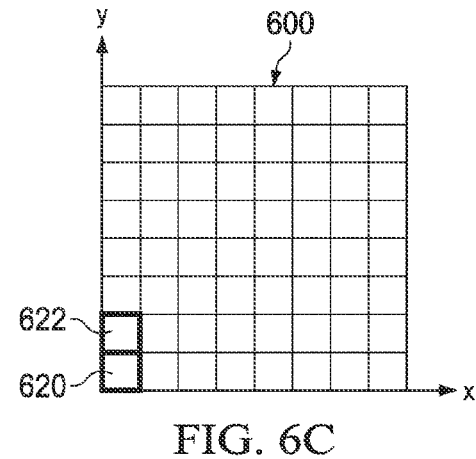
FIG. 6C illustrates cells of size (8, 8) defined in an image of size (64, 128), in accordance with an example scenario.

FIG. 6C illustrates an image 600 of size (64, 128) representing a cell 620 and a cell 622 of sizes (8*8). In one embodiment, the cell 620 of size (8*8) is formed by combining the cells 602, 604, 608 and 610 of size (4*4) as described with reference to FIGS. 6A and 6B. In an example, the feature plane computation module 406 computes a feature plane summation $C_3(Y)$ (of type Y-plane) for the cell 620 of size (8,8) by summing Y-feature plane summations of the cells 602, 604, 608 and 610. The feature plane summation $C_3(Y)$ (of type Y-plane) for the cell 620 of size (8*8) is represented by the following expression:

$$C_3(Y) = C_{11}(Y) + C_{21}(Y) + C_{41}(Y) + C_{51}(Y) \quad (14)$$

Where
$C_{11}(Y)$ = Y-feature plane summation of the cell 602
$C_{21}(Y)$ = Y-feature plane summation of the cell 604
$C_{41}(Y)$ = Y-feature plane summation of the cell 608
$C_{51}(Y)$ = Y-feature plane summation of the cell 610

Similarly, the cell 622 of size (8*8) is formed by combining the cells 608, 610, 614 and 616 of size (4*4). In an embodiment, the feature plane computation module 406 computes a feature plane summation $C_4(Y)$ (of type Y-plane) for the cell 622 of size (8,8) by summing Y-feature plane summations of the cells 608, 610, 614 and 616 of size (4*4). As a result, the feature plane computation module 406 re-uses the Y-feature plane summations of the cells 608 and 610 in computing the Y-feature plane summation for the eleventh cell 622. Similarly, summations for the other planes such as U plane, V plane and 6 HOG planes are also computed.

Figure 7:
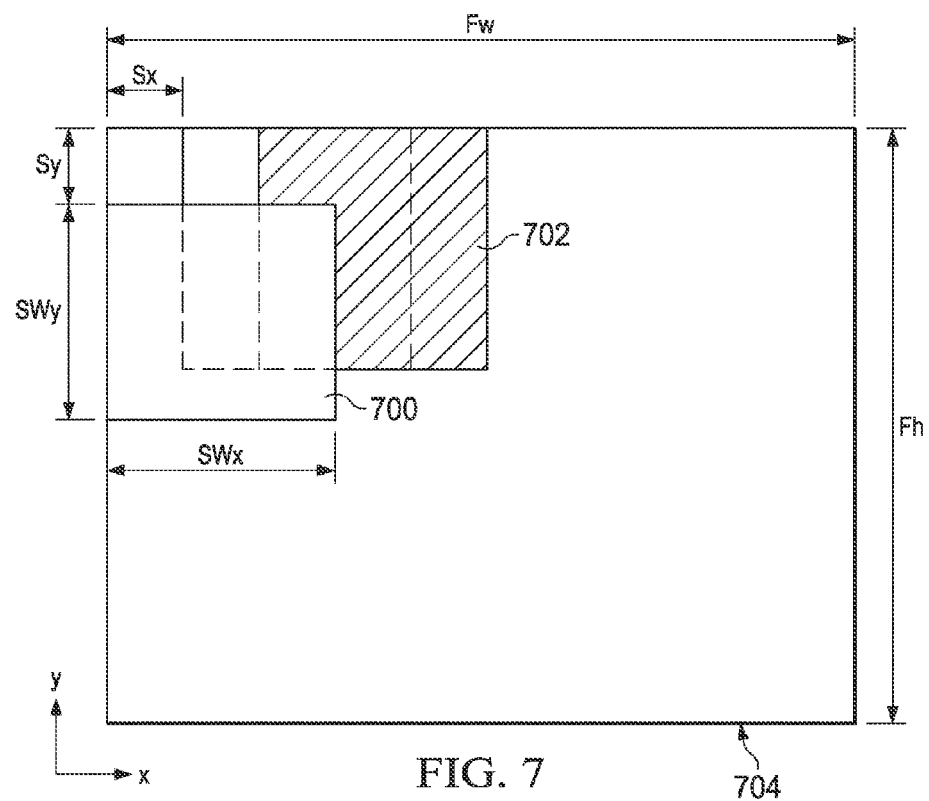
FIG. 7 illustrates detection windows within an image frame, in accordance with an embodiment.

FIG. 7 illustrates examples of detection windows 700 and 702 employed for object detection in an input image 704. The input image 704 has a frame size ($F_w$, $F_h$), where $F_w$ is frame width, $F_h$ is frame height, and $F_h * F_w$ is total number of image pixels in the input image 704. In one embodiment, each of the detection windows 700 and 702 are image portions of the input image 704 with size ($SW_x$, $SW_y$), where $SW_x$ is window width, $SW_y$ is window height, and $SW_x * SW_y$ is total number of image pixels in the detection window (700, 702). The step size of the detection window (700, 702) is referred to as $S_x * S_y$, where $S_x$ is number of pixels traversed by the detection window (700, 702) in one movement along the x-direction, and $S_y$ is number of pixels traversed by the detection window (700, 702) in one movement along the y-direction.

The feature vector computation and partial classification module 408 (see FIG. 4), selects the first detection window 700 and selects a type of feature plane for computing a first partial feature vector therein. The first partial feature vector is a set of feature plane summations of the selected type, corresponding to each cell of the first detection window 700. In an example, when the feature vector computation and partial classification module 408 selects Y-feature plane, the first partial feature vector is a set including the Y-feature plane summations of cells defined within the first detection window 700. The first partial feature vector $P_{11}(Y)$ for the Y-feature plane for the first detection window 700 (including first through $n^{th}$ cells) is represented by the following expression:

$$P_{11}(Y) = \{C_1(Y), C_2(Y), C_3(Y) \ldots C_n(Y)\} \quad (15)$$

Where
$C_1(Y)$ = Y-feature plane summation of a first cell of the first detection window 700
$C_2(Y)$ = Y-feature plane summation of a second cell of the first detection window 700
$C_n(Y)$ = Y-feature plane summation of an $n^{th}$ cell of the first detection window 700

In an example scenario, when the size of the first detection window 700 is (64*128), and the cell size is (8*8), the number of cells in the first detection window is equal to (64/8)*(128/8)=128. Accordingly, the number of elements in a partial feature vector is equal to the total number of cells, i.e. 128, and the number of partial feature vectors is equal to 10. Further, the complete feature vector includes feature plane summations of each type for each cell of the first detection window 700. When the number of feature plane summation types is ten, the complete feature vector includes 128*10=1280 elements.

The feature vector computation and partial classification module 408 compares the first partial feature vector with a corresponding partial classifier of the object, to detect the presence of Y-data of object in the first detection window 700, and stores a result of comparison in the memory 402, instead of storing the first partial feature vector. The feature vector computation and partial classification module 408 then selects a next type of feature plane, such as U-feature plane for computing a second partial feature vector for the first detection window 700. Thereafter, it compares the second partial feature vector with a corresponding partial classifier of the object, to detect whether the U-data of the object is detected in the first detection window 700, and stores the result of comparison in the memory 402. In an example scenario, the partial object classifier is an ADA-BOOST classifier.

In the similar manner, the feature vector computation and partial classification module 408, in an iterative manner, performs the steps of computing a partial feature vector for a next feature plane and comparing with a corresponding partial classifier to store the result of comparison in the memory 402. As a result, the feature vector computation and partial classification module 408 iteratively computes ten partial feature vectors and performs ten comparisons with corresponding partial object classifiers to store ten comparison results in the memory 402.

The feature vector computation and partial classification module 408 stores only comparison results in the memory 402 instead of storing the feature plane summations of cells of the first detection window 700, thus significantly saving memory bandwidth (for example, double data rate (DDR) memory bandwidth). The feature vector computation and partial classification module 408 bypasses the computation of the complete feature vector for the first detection window 700, (requiring computation of 1280 elements together), and computes only one partial feature vector (requiring computation of 128 elements together) at a time, thus significantly saving DDR bandwidth.

The final classification module 410 collates the comparison results generated by the feature vector computation and partial classification module 408, and accordingly makes a final decision on whether the object is present in the first detection window 700. In one embodiment, the feature vector computation and partial classification module 408 computes a score corresponding to each partial feature vector based on comparison with corresponding partial object classifier, and thus generates total ten partial scores corresponding to each feature plane type. The final classification module 410 adds the ten partial scores to generate a final score for indicating whether the object is present in the first detection window 700.

Thereafter, the feature vector computation and partial classification module 408 selects the second detection window 702 (see FIG. 7), and computes the corresponding partial feature vectors and partial scores. The final classification module 410 then collates the partial scores to detect the presence of the object in the second detection window 702. The feature vector computation and partial classification module 408 computes partial scores and the final classification module 410 collates the partial scores in a sequential manner for each of the remaining detection windows of the image 704, thereby detecting the presence of the corresponding object in the image 704. It should be noted that in some example embodiments, all of the 1280 elements may also be computed in a single cycle, and thereafter these elements can be compared with a classifier to detect the presence of the object in the detection window (the image portion).

Figure 8:
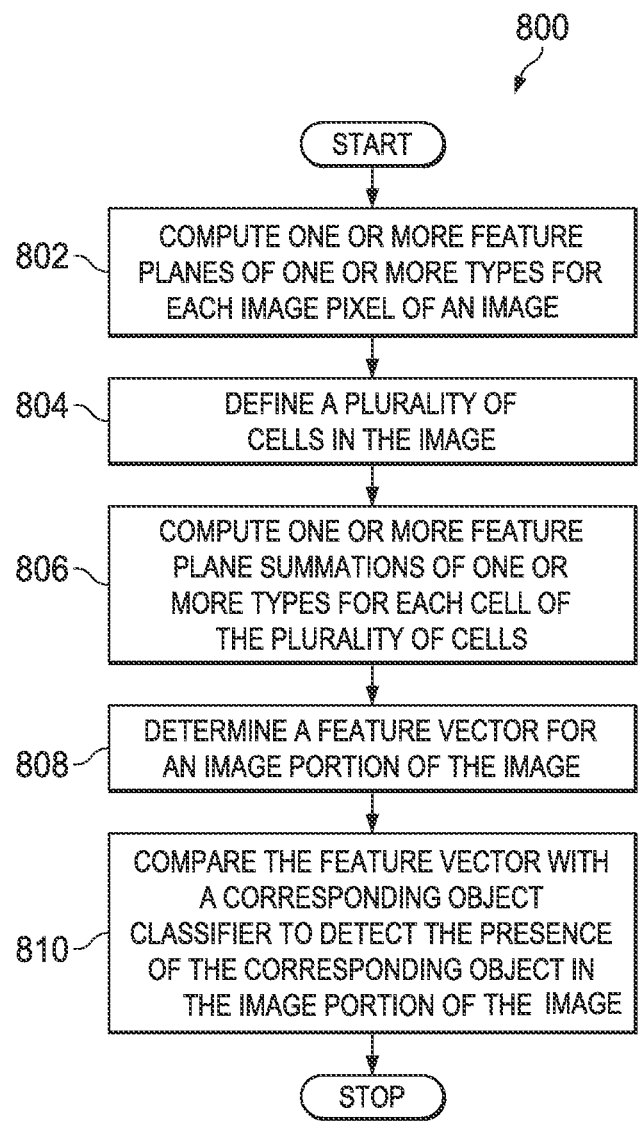
FIG. 8 is a flow diagram chart of a method of detecting an object in an image, in accordance with an embodiment.

FIG. 8 is a flow diagram of a method of detecting an object in an image, in accordance with an embodiment. In certain embodiments, operations of method 800 are performed by a processor, such as, for example, the processor 400 (see, e.g., FIG. 4).

At block 802, the method includes computing one or more feature planes of one or more types for each image pixel of an image (an input image), for example image 100 (see, FIG. 1). For example, feature planes of ten types are computed for each image pixel, where ten types of feature planes include Y, U, V feature planes, M feature plane and six HOG feature planes. The six HOG feature planes for an image pixel are computed based on the horizontal and vertical gradients of the image pixel.

At block 804, the method includes defining a plurality of cells in the image 100, where each cell includes first through $n^{th}$ number of pixels. The starting locations of each cell in the image 100 in horizontal and vertical directions are integral multiples of predefined horizontal and vertical step sizes respectively. For instance, when the horizontal and vertical step sizes are 4 pixels each, then irrespective of cell size, the starting locations of the cells are at 0, 4, 8, 12 . . . pixels in x and y directions.

At block 806, the method includes computing one or more feature plane summations of one or more types for each cell of the plurality of cells. A feature plane summation of a type for a cell is computed by summing corresponding feature planes of the first through nth number of pixels of the cell. In an example scenario, a feature plane summation $C_1(Y)$ (of type Y-feature plane) for a cell of size (6*6), for example the first cell 502 (see, FIG. 5) is computed by summing Y-feature planes of all the 36 pixels of the first cell 502.

At block 808, the method includes determining a feature vector for an image portion, for example the first detecting window 700, of the image 704 (see, FIG. 7). The feature vector of the image portion includes a set of feature plane summations of cells defined in the image portion. In one embodiment, the feature vector is a partial feature vector, which includes a set of feature plane summations of only one type, for the cells defined in the image portion.

At block 810, the method includes comparing the feature vector with a corresponding object classifier to detect the presence of the corresponding object in the image portion of the image. In one embodiment, the feature vector is a partial feature vector, and is compared with a corresponding partial object classifier to detect the presence of the corresponding object in the image portion. It should be understood that the presence of the object is detected in various image portions (for example, in various detection windows described with reference to FIG. 7) to determine the presence of the object in whole image.

In an embodiment of partial feature vectors, the partial feature vector is iteratively determined for each type of feature plane, and the partial feature vector for each type is compared with corresponding partial classifier of the each type. Further, the result of the comparison for each type is stored in the memory. Furthermore, the one or more comparison results corresponding to each type of the feature plane are collated, and the presence of the object is detected in the image based on the collated results.

Without in any way limiting the scope, interpretation, or application of the claims appearing below, advantages of one or more of the example embodiments disclosed herein include detecting an object in an input image using an object detection system. Various embodiments of the present disclosure provide an object detection system, in which HOG bin of an image pixel gradient is determined based on the mathematical relationship between horizontal and vertical gradients of the image pixel without computing the orientation of the gradient, thereby resulting in around 30-45% performance improvement in feature plane computation. Further, the partial feature vector computation instead of complete feature vector computation significantly saves around 95% of the memory bandwidth. The computational complexity and footprint of the proposed object detection system is considerably less than that of the traditional design. Further, the proposed object detection system can be adapted for any value of cell size, detection window size, step size, number of feature planes, number of feature vectors and any type of classifier.

It should be noted that reference throughout this specification to features, advantages, or similar language does not imply that all of the features and advantages should be, or are in, any single embodiment. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification do not necessarily, refer to the same embodiment.

Various embodiments of the present disclosure, as discussed above, are practiced with steps and/or operations in a different order, and/or with hardware elements in configurations which are different than those which are disclosed. Therefore, although the disclosure has been described based upon these example embodiments, it is noted that certain modifications, variations, and alternative constructions are apparent and well within the spirit and scope of the disclosure. Although various example embodiments of the present disclosure are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. An object detection system for detecting an object in an image, the image comprising a plurality of image pixels, the object detection system comprising:
    a memory to store instructions; and
    a processor responsive to stored instructions to perform the steps of:
        computing one or more feature planes of one or more types for each image pixel of the image;
        defining a plurality of cells in the image, each cell comprising first through $n^{th}$ number of pixels, and starting locations of each cell in the image in horizontal and vertical directions being integral multiples of predefined horizontal and vertical step sizes, respectively;
        computing one or more feature plane summations of one or more types for each cell of the plurality of cells, wherein a feature plane summation of a type for a cell is computed by summing corresponding features of the first through $n^{th}$ number of pixels of the cell, n being an integral number;
        determining a feature vector for an image portion of the image, the feature vector comprising a set of feature plane summations of one or more cells defined in the image portion; and
        comparing of the feature vector with a corresponding object classifier to detect a presence of the object in the image portion of the image.

2. The object detection system of claim 1, wherein the one or more feature planes of one or more types comprise:
    first, second and third feature planes for representing a color scheme of the image pixel;
    a fourth feature plane for representing a gradient magnitude of the image pixel; and
    fifth to $m^{th}$ Histogram of Gradient (HOG) feature planes for representing a gradient of the image pixel in corresponding fifth to $m^{th}$ HOG bins, m being an integral number.

3. The object detection system of claim 2, wherein each HOG bin of the fifth to $m^{th}$ HOG bins is assigned a minimum binning angle and a maximum binning angle, and wherein a tangent of each of the minimum binning angle and the maximum binning angle is a rational number, and wherein the fifth to $m^{th}$ HOG feature planes of the image pixel are determined based on at least one of a shift operation, a subtraction operation and a comparison operation.

4. The object detection system of claim 3, wherein the fifth to $m^{th}$ Histogram of Gradient (HOG) feature planes for an individual image pixel is computed by:
    computing a horizontal gradient and a vertical gradient of the image pixel, and determining a corresponding HOG bin from among the fifth to $m^{th}$ HOG bins based on a ratio of the horizontal gradient and vertical gradient, wherein the corresponding HOG bin is determined by comparing the ratio with a first threshold value and a second threshold value associated with the corresponding HOG bin;
    computing a gradient value of the image pixel; and
    assigning the gradient value to a HOG feature plane corresponding to the determined HOG bin, and assigning zero values to remaining HOG feature planes of fifth to $m^{th}$ HOG feature planes.

5. The object detection system of claim 1, wherein the processor is further responsive to stored instructions to perform the steps of:
    computing a feature vector of a next image portion of the image portion of the image; and
    comparing the feature vector of the next image portion with a corresponding object classifier, wherein the step of computing and comparing is performed in a sequential manner for each of remaining image portions of the image, thereby detecting the presence of the corresponding object in the image.

6. The object detection system of claim 5, wherein a feature plane summation for a cell of predefined first horizontal and vertical cell sizes is computed based on corresponding feature plane summations of one or more cells of predefined second horizontal and vertical cell sizes, when the predefined first horizontal and vertical cell sizes are integral multiples of the predefined second horizontal and vertical cell sizes respectively.

7. The object detection system of claim 1, wherein the processor is responsive to stored instructions to perform the steps of determining and comparing the feature vector by performing in an iterative manner:
    selecting a type of feature plane from the one or more types of feature planes;
    computing a partial feature vector, the partial feature vector comprising one or more feature plane summations of the selected type, for one or more cells of the image portion;
    comparing the partial feature vector with a corresponding partial classifier of the object; and
    storing a result of a comparison in the memory;
    collating one or more comparison results corresponding to each type of the feature plane of the one or more types of feature planes; and
    detecting the presence of the object in the image based on the collated results.

8. The object detection system of claim 1, wherein the processor is responsive to stored instructions to perform the step of scaling the image by a predefined scaling factor to obtain a scaled image.

9. A method of detecting an object in an image, the image comprising a plurality of image pixels, the method comprising:
- computing one or more feature planes of one or more types for each image pixel of the image;
- defining a plurality of cells in the image, each cell comprising first through $n^{th}$ number of pixels, and starting locations of each cell in the image in horizontal and vertical directions are integral multiples of predefined horizontal and vertical step sizes respectively;
- computing one or more feature plane summations of one or more types for each cell of the plurality of cells, wherein a feature plane summation of a type for a cell is computed by summing corresponding feature planes of the first through nth number of pixels of the cell, n being an integral number;
- determining a feature vector for an image portion of the image, the feature vector comprising a set of feature plane summations of one or more cells defined in the image portion; and
- comparing the feature vector with a corresponding object classifier to detect a presence of the object in the image portion of image.

10. The method of claim 9, wherein the computing the one or more feature planes of one or more types comprises:
- computing first, second and third feature planes for representing a color scheme of the image pixel;
- computing a fourth feature plane for representing an intensity of the image pixel; and
- computing fifth to $m^{th}$ Histogram of Gradient (HOG) feature planes for representing a gradient of the image pixel in corresponding fifth to $m^{th}$ HOG bins, m being an integral number.

11. The method of claim 10, wherein each HOG bin of the fifth to $m^{th}$ HOG bins is assigned a minimum binning angle and a maximum binning angle, and wherein a tangent of each of the minimum binning angle and the maximum binning angle is a rational number, and wherein the fifth to $m^{th}$ HOG feature planes of the image pixel are determined based on at least one of shift operation, subtraction operation and comparison operation.

12. The method of claim 9, wherein the computing the fifth to $m^{th}$ Histogram of Gradient (HOG) feature planes for an individual image pixel comprises:
- computing a horizontal gradient and a vertical gradient of the image pixel, and determining a corresponding HOG bin from among the fifth to $m^{th}$ HOG bins based on a ratio of the horizontal gradient and vertical gradient, wherein the corresponding HOG bin is determined by comparing the ratio with a first threshold value and a second threshold value associated with the corresponding HOG bin;
- computing a gradient value of the image pixel; and
- assigning the gradient value to a HOG feature plane corresponding to the determined HOG bin, and assigning zero values to remaining HOG feature planes of fifth to $m^{th}$ HOG feature planes.

13. The method of claim 9 further comprising:
- computing a feature vector of a next image portion of the image portion of the image; and
- comparing the feature vector of the next image portion with corresponding object classifier, wherein the step of computing and comparing is performed in a sequential manner for each of remaining image portions of the image, thereby detecting the presence of the corresponding object in the image.

14. The method of claim 9 further comprising computing a feature plane summation for a cell of predefined first horizontal and vertical cell sizes, based on corresponding feature plane summations of one or more cells of predefined second horizontal and vertical cell sizes, when the predefined first horizontal and vertical cell sizes are integral multiples of the predefined second horizontal and vertical cell sizes respectively.

15. The method of claim 9, wherein the steps of determining and comparing the feature vector comprise:
- performing in an iterative manner:
  - selecting a type of feature plane from the one or more types of feature planes;
  - computing a partial feature vector, the partial feature vector comprising one or more feature plane summations of the selected type, of one or more cells of the image portion;
  - comparing the partial feature vector with a corresponding partial classifier of the object; and
  - storing a result of a comparison in the memory;
- collating one or more comparison results corresponding to each type of the feature plane of the one or more types of feature planes; and
- detecting the presence of the object in the image based on the collated results.

16. The method of claim 9 further comprising scaling the image by a predefined scaling factor to obtain a scaled image.

17. A method of detecting an object in an image, the image comprising a plurality of image pixels, the method comprising:
- computing one or more feature planes of one or more types for each image pixel of the image;
- defining a plurality of cells in the image, each cell comprising first through $n^{th}$ number of pixels, and starting locations of each cell in the image in horizontal and vertical directions are integral multiples of predefined horizontal and vertical step sizes respectively;
- computing one or more feature plane summations of one or more types for each cell of the plurality of cells, wherein a feature plane summation of a type for a cell is computed by summing corresponding feature planes of the first through nth number of pixels of the cell, n being an integral number;
- performing in an iterative manner:
  - selecting a type of feature plane from the one or more types of feature planes;
  - computing a partial feature vector, the partial feature vector comprising one or more feature plane summations of the selected type, for one or more cells of the image portion;
  - comparing the partial feature vector with a corresponding partial classifier of the object; and
  - storing a result of a comparison in the memory;
- collating one or more comparison results corresponding to each type of the feature plane; and
- detecting the presence of the object in the image based on the collated results.

18. The method of claim 17, wherein the computing the one or more feature planes of one or more types comprises:
- computing first, second and third feature planes for representing a color scheme of the image pixel;
- computing a fourth feature plane for representing an intensity of the image pixel; and computing fifth to $m^{th}$ Histogram of Gradient (HOG) feature planes for representing a gradient of the image pixel in corresponding fifth to $m^{th}$ HOG bins, m being an integral number.

19. The method of claim 17, wherein each HOG bin of the fifth to $m^{th}$ HOG bins is assigned a minimum binning angle and a maximum binning angle, and wherein a tangent of each of the minimum binning angle and the maximum binning angle is a rational number, and wherein the fifth to $m^{th}$ HOG feature planes of the image pixel are determined based on at least one of shift operation, subtraction operation and comparison operation.

20. The method of claim 17, wherein the computing the fifth to $m^{th}$ Histogram of Gradient (HOG) feature planes for an individual image pixel comprises:

computing a horizontal gradient and vertical gradient of the image pixel, and determining a corresponding HOG bin from among the fifth to $m^{th}$ HOG bins based on a ratio of the horizontal gradient and vertical gradient, wherein the corresponding HOG bin is determined by comparing the ratio with a first threshold value and a second threshold value associated with the corresponding HOG bin;

computing a gradient value of the image pixel; and assigning the gradient value to a HOG feature plane corresponding to the determined HOG bin, and assigning zero values to remaining HOG feature planes of fifth to $m^{th}$ HOG feature planes.

* * * * *